(12) United States Patent
Naito

(10) Patent No.: US 11,979,534 B2
(45) Date of Patent: May 7, 2024

(54) IMAGE FORMING APPARATUS HAVING PRINT SPEED CONTROL, CONTROL METHOD THEREOF, AND STORAGE MEDIUM

(71) Applicant: CANON KABUSHIKI KAISHA, Tokyo (JP)

(72) Inventor: Yosui Naito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/101,195

(22) Filed: Jan. 25, 2023

(65) Prior Publication Data

US 2023/0262184 A1    Aug. 17, 2023

(30) Foreign Application Priority Data

Feb. 17, 2022   (JP) .................. 2022-022953

(51) Int. Cl.
   *H04N 1/00*    (2006.01)
(52) U.S. Cl.
   CPC ..... *H04N 1/00925* (2013.01); *H04N 1/00413* (2013.01); *H04N 1/0048* (2013.01); *H04N 1/00891* (2013.01)

(58) Field of Classification Search
   USPC ....................................... 358/1.13
   See application file for complete search history.

(56) References Cited

U.S. PATENT DOCUMENTS

2014/0211218 A1* 7/2014 Yuki .................. H04N 1/4433
                                                  358/1.5
2014/0211219 A1* 7/2014 Yabe .................. H04N 1/4433
                                                  358/1.5

FOREIGN PATENT DOCUMENTS

JP         2021-005005 A    1/2021

* cited by examiner

*Primary Examiner* — Jacky X Zheng
(74) *Attorney, Agent, or Firm* — VENABLE LLP

(57) ABSTRACT

An image forming apparatus includes a registration unit that registers a speed license for setting an image forming speed, and an image forming unit that performs image formation at an image forming speed corresponding to the speed license registered by the registration unit. In addition, a control unit permits the image formation by the image forming unit in a case where the speed license is registered by the registration unit, and permits the image formation by the image forming unit in a case where an operation mode of the image forming apparatus is a predetermined mode different from a normal operation mode if the speed license is unregistered by the registration unit.

11 Claims, 13 Drawing Sheets

IMAGE FORMING APPARATUS HAVING PRINT SPEED CONTROL, CONTROL METHOD THEREOF, AND STORAGE MEDIUM

BACKGROUND OF THE INVENTION

Field of the Invention

The present invention relates to an image forming apparatus that allows changing a print speed by license, a control method thereof, and a storage medium.

Description of the Related Art

A plurality of models that provide different printable speeds using image forming apparatuses having the same hardware configuration have been developed in the market. Japanese Patent Laid-Open No. 2021-5005 proposes a method of switching from a low print speed to a high print speed by inputting a license to an image forming apparatus after the apparatus is shipped from a factory.

In addition to providing the license to a user as a product, the license is useful for eliminating imbalance in market inventory and is also used for setting the print speed at the time of installation of the image forming apparatus in accordance with the purchased license. Specifically, there has been proposed a method in which the apparatus is set in a printing disabled state in a state of being shipped from a factory, and the speed is determined by inputting the license to the apparatus such that the apparatus can perform printing for the first time.

However, the conventional technology described above has a problem described below. For example, there is a case where a user obtains the apparatus after shipment from a factory and exchanges a component before use, and therefore an adjustment work of a print image is required. However, when printing is disabled in an initial state of the apparatus as in the above-described conventional technology, there is a problem that even when image adjustment is required before inputting the license of the print speed, printing for image adjustment cannot be performed, and therefore image adjustment cannot be performed.

SUMMARY OF THE INVENTION

The present invention enables realization of a mechanism for permitting printing when a certain condition is satisfied even before registration of a license for determining a print speed.

One aspect of the present invention provides an image forming apparatus, comprising: a registration unit that registers a speed license for setting an image forming speed; an image forming unit that performs image formation at an image forming speed corresponding to the speed license registered by the registration unit; and a control unit that permits the image formation by the image forming unit in a case where the speed license is registered by the registration unit, and permits the image formation by the image forming unit in a case where a predetermined condition is satisfied even if the speed license is unregistered by the registration unit.

Another aspect of the present invention provides a control method for an image forming apparatus including an image forming unit, comprising: registering a speed license for setting an image forming speed; controlling permitting image formation by the image forming unit in a case where the speed license is registered in the registering; and controlling permitting the image formation by the image forming unit in a case where a predetermined condition is satisfied even if the speed license is unregistered in the registering.

Still another aspect of the present invention provides a non-transitory computer-readable storage medium storing a program for causing a computer to execute each step in a control method for an image forming apparatus including an image forming unit, the control method comprising: registering a speed license for setting an image forming speed; controlling permitting image formation by the image forming unit in a case where the speed license is registered in the registering; and controlling permitting the image formation by the image forming unit in a case where a predetermined condition is satisfied even if the speed license is unregistered in the registering.

Further features of the present invention will become apparent from the following description of exemplary embodiments (with reference to the attached drawings).

DESCRIPTION OF THE EMBODIMENTS

Figure 1:
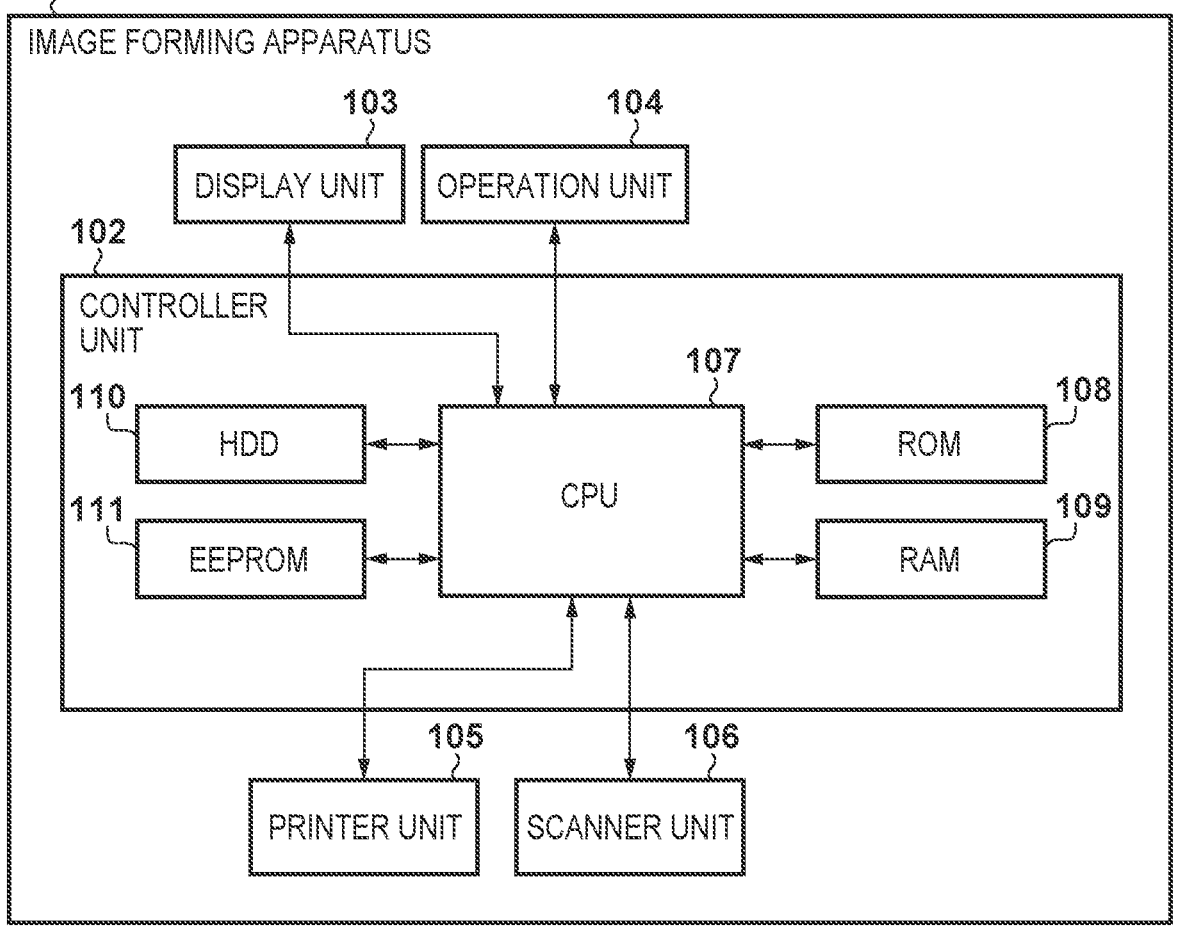
FIG. 1 is a drawing illustrating an overall configuration of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Arrangement

The first embodiment of the present invention will be described below with reference to the drawings. First, with reference to FIG. 1, an entire configuration of a system according to the present embodiment will be described.

An image forming apparatus 101 includes a controller unit 102, a display unit 103, an operation unit 104, a printer unit 105, and a scanner unit 106. The display unit 103 includes an LED and a liquid crystal display, and displays operation contents of a user and internal information of the apparatus. The operation unit 104 receives an operation from the user. Further, the operation unit 104 may be achieved as a touch display together with the display unit 103, in addition to including a plurality of operation buttons.

The printer unit 105 receives a print instruction from the controller unit 102, and prints image data transmitted from the controller unit 102 on a paper sheet. Further, the actual print speed is switched in accordance with a print speed instruction notified from the controller unit 102 on start-up. The scanner unit 106 receives a reading instruction from the controller unit 102, performs a reading operation, and transmits the image data to the controller unit 102.

The controller unit 102 includes a CPU 107, a ROM 108, a RAM 109, an HDD 110, and an EEPROM 111. The central processing unit (CPU) 107 is an execution medium of a control program incorporated in the image forming apparatus 101, and controls operations of apparatuses connected to the controller unit 102 via, for example, each I/F and a memory of a storage medium. The read-only memory (ROM) 108 stores, for example, a boot program required for system start. The random access memory (RAM) 109 is a volatile memory and is a work memory required to execute a control program. The hard disk drive (HDD) 110 is a storage medium, such as a magnetic disk, and stores, for example, a control program and image data. The electrically erasable programmable ROM (EEPROM) 111 is a non-volatile memory and stores, for example, setting values required when the control program is executed. The EEPROM 111 also holds a serial number for identifying an individual, a print speed notified to the printer unit 105, and a counter value indicating how many prints have been performed.

Registration Procedure of Speed License

Figure 9:
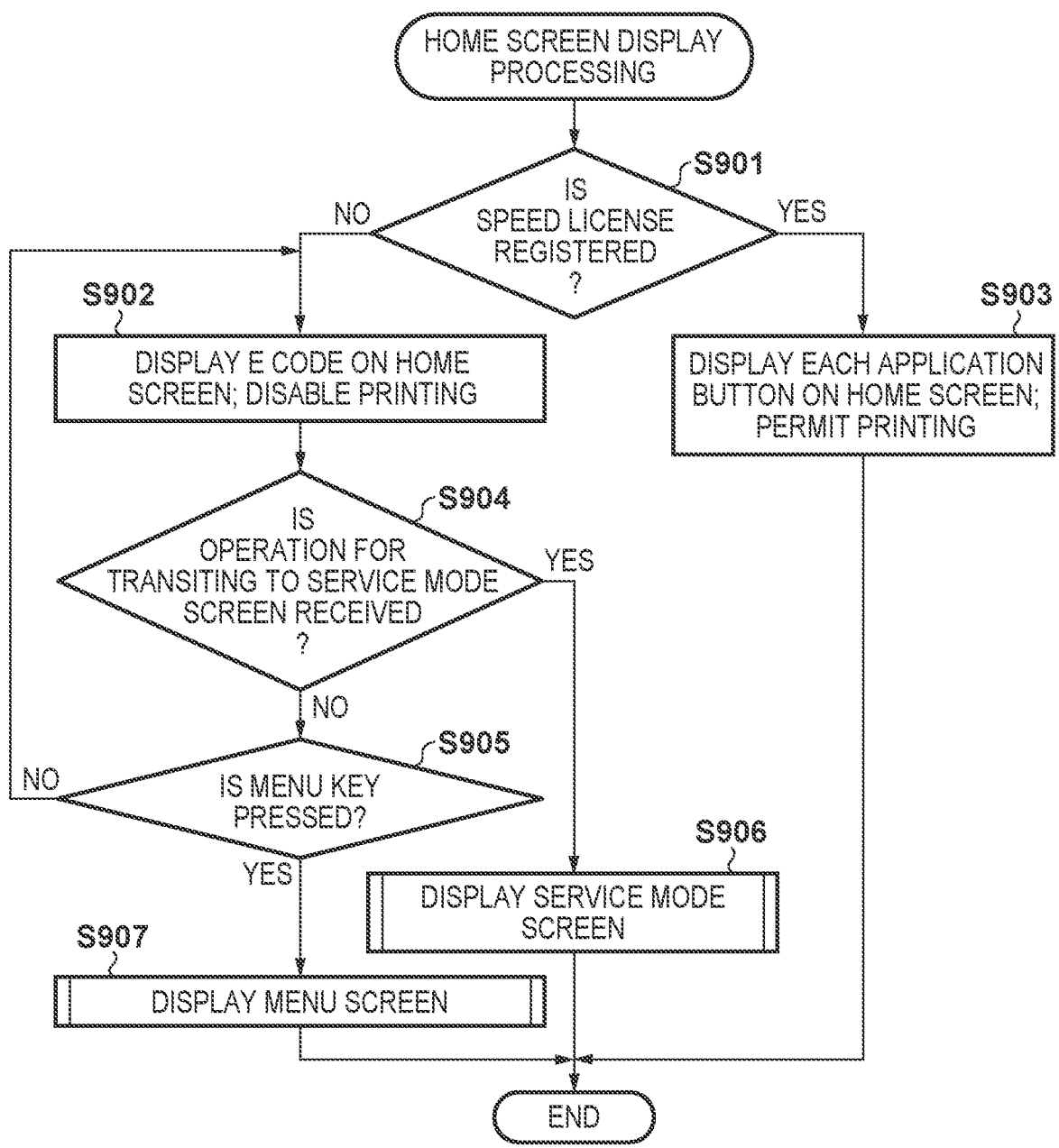
FIG. 9 is a flowchart of home screen display processing according to an embodiment.
Figure 10:
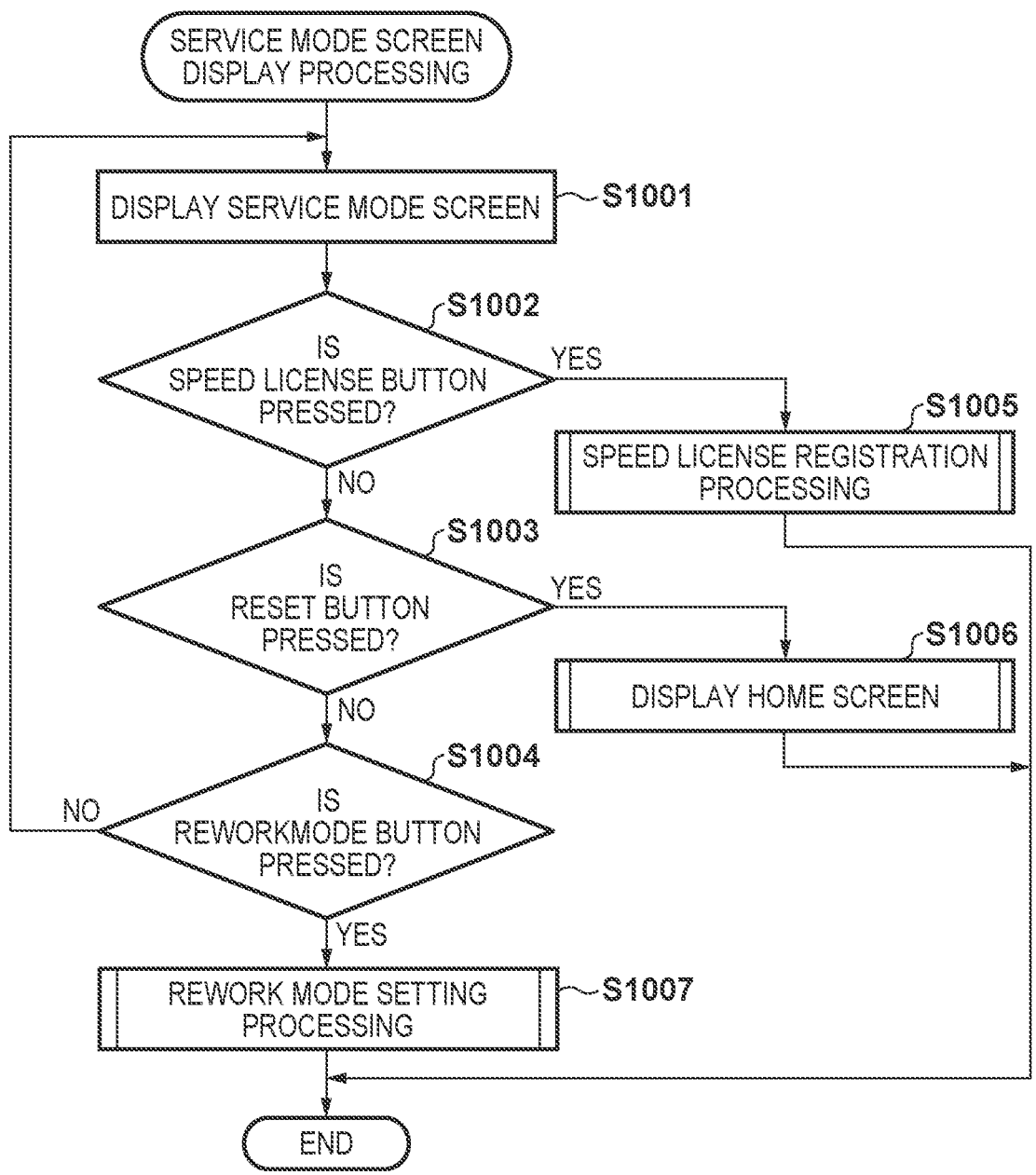
FIG. 10 is a flowchart of service mode screen display processing according to an embodiment.
Figure 11:
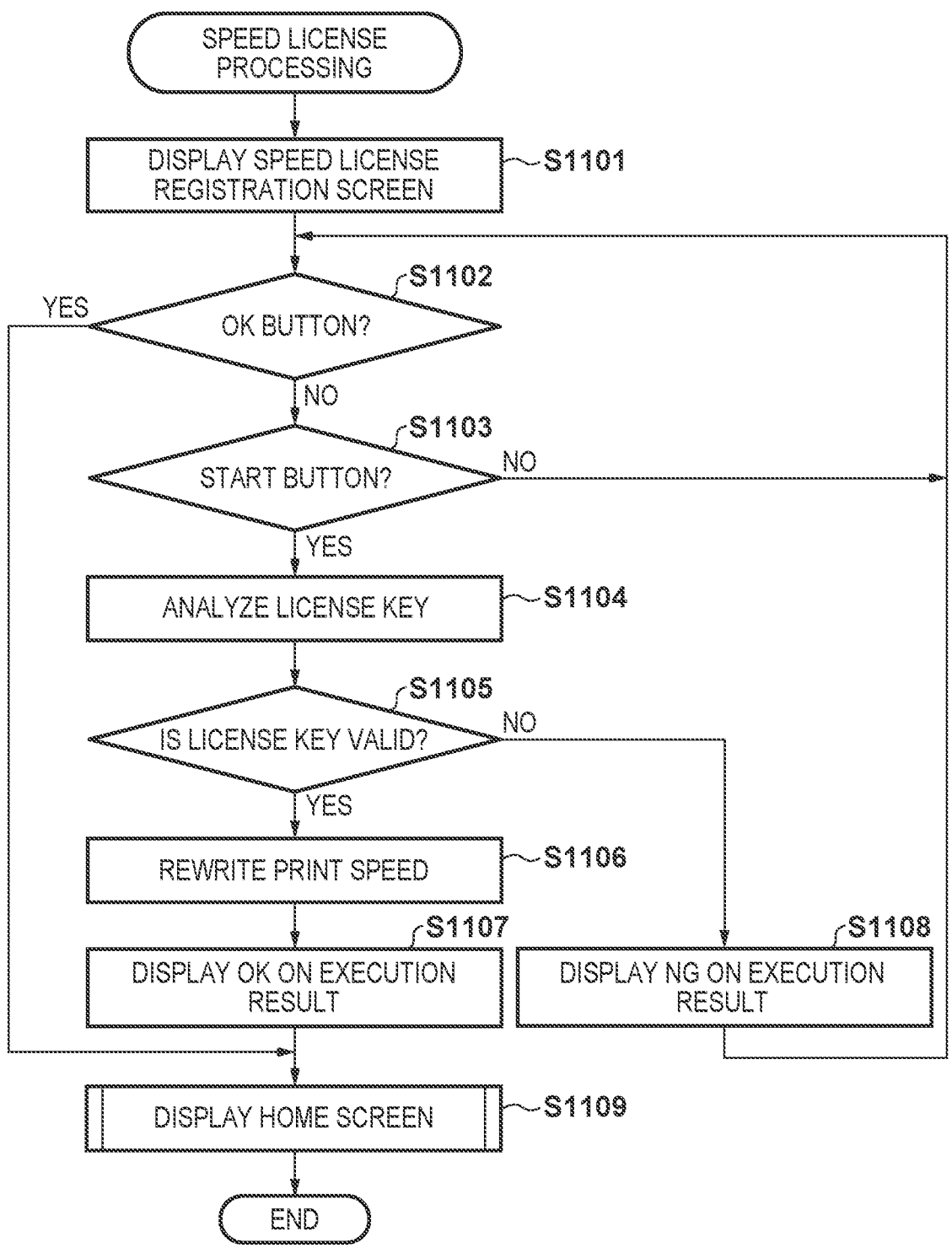
FIG. 11 is a flowchart of speed license registration processing according to an embodiment.

With reference to FIGS. 9 to 11, a processing procedure for registering the speed license from a speed license unregistered state according to the present embodiment will be described. The processing described below is achieved, for example, by the CPU 107 reading the control program stored in the ROM 108 and the HDD 110 into the RAM 109 and executing it.

Home Screen Display

Figure 2:
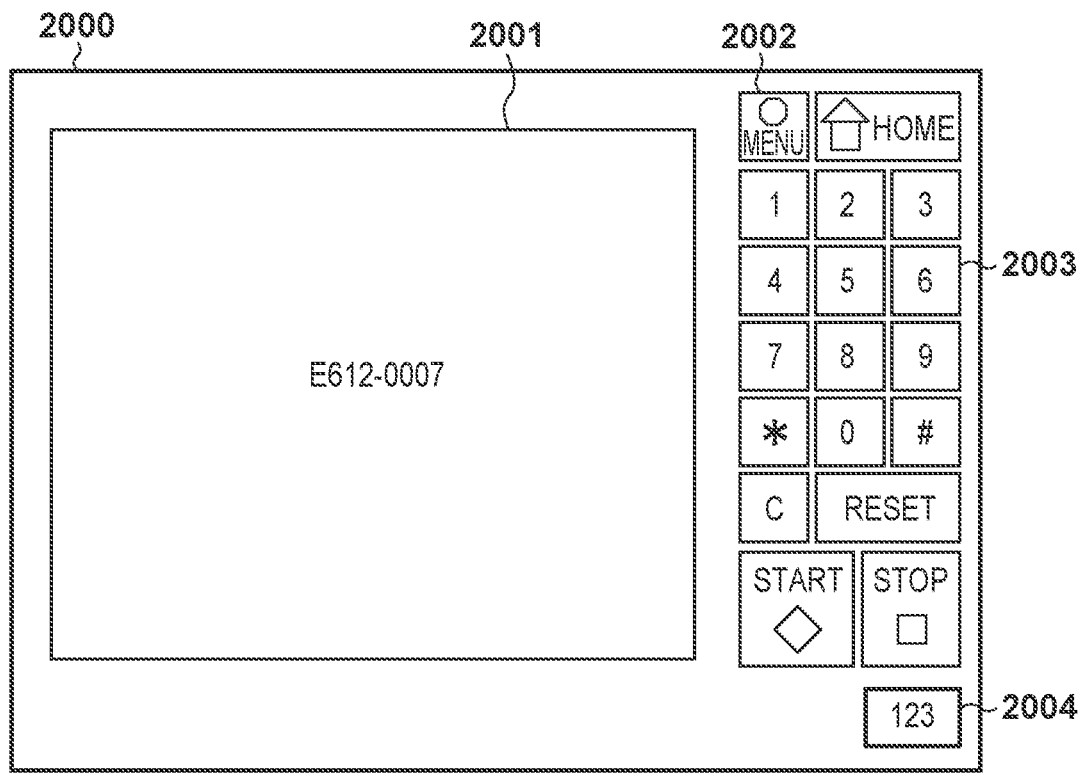
FIG. 2 is a diagram illustrating an example of a home screen displaying an E code according to an embodiment.

FIG. 9 describes a processing flow when a home screen is displayed. First, in S901, the CPU 107 determines whether the speed license has been registered. The determination is made based on whether the print speed stored in the EEPROM 111 is undetermined. When unregistered, the processing proceeds to S902, and as illustrated in FIG. 2, the CPU 107 displays a home screen 2000 on the display unit 103 in a state where an E code (error code) is displayed in a display area 2001. The home screen 2000 includes a menu key 2002, a numeric keypad 2003, and a counter key 2004 in addition to the display area 2001. Note that these key groups may be achieved by software buttons, or may be achieved as mechanical buttons achieved by hardware. The same applies to a reset button 3004 described later.

Since the speed license is unregistered in a state where the home screen 2000 is displayed, various applications cannot be used, and printing is also disabled. That is, in the state where the screen displaying the E code is displayed in S902, not only printing of COPY or PDL but also test chart printing for image adjustment cannot be performed at all. In the present embodiment, a special mode used by a service person who installs the image forming apparatus 101 is referred to as a service mode, and a screen from an operation panel is referred to as a service mode screen. In the present invention, the user of the service mode is not limited to only the service person, but when a specific person, such as a delivery company of the image forming apparatus 101, operates it, the service mode may be usable.

Subsequently, in S904, the CPU 107 determines whether a special key operation for switching to display of a service mode screen 3000 has been performed via the operation unit 104. When it is detected that the special key operation has been performed, the processing proceeds to S906, and otherwise the processing proceeds to S905. In S906, the CPU 107 displays the service mode screen 3000 on the display unit 103 to end the processing of this flowchart. Here, the special key operation for switching to the service mode screen is, for example, pressing the counter key 2004, sequentially pressing "1", "2", "3", and "4" in the numeric keypad 2003, and pressing the counter key 2004 again. Details of the service mode screen 3000 will be described below.

When the operation instruction to the service mode screen 3000 is not received, the processing proceeds to S905, and the CPU 107 determines whether the menu key has been pressed. When the menu key is not pressed, the processing is returned to S902, and when pressed, the processing proceeds to S907. In S907, the CPU 107 displays a menu screen 5000 on the display unit 103 to end the processing of this flowchart.

Figure 8:
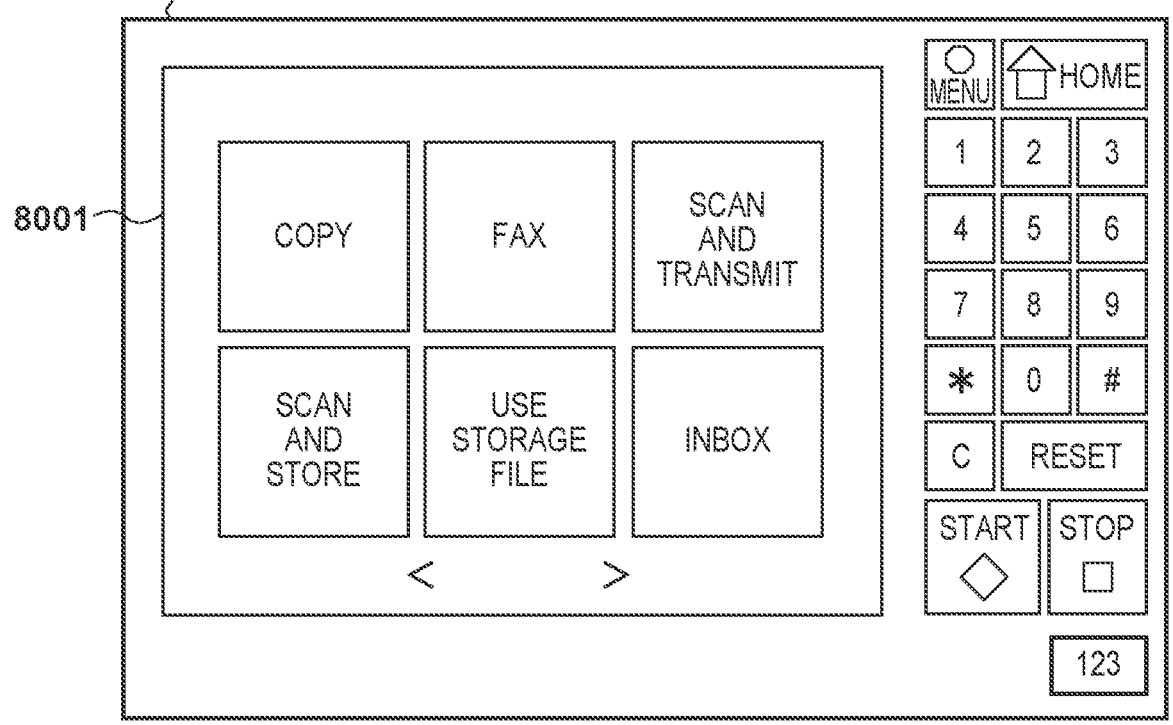
FIG. 8 is a diagram illustrating an example of a normal home screen according to an embodiment.

On the other hand, when it is determined that the speed license has been registered in S901, the processing proceeds to S903, and the CPU 107 displays a home screen 8000 in a state of not displaying the E-code on the display unit 103 to end the processing of this flowchart. In the state where the home screen 8000 is displayed, printing is permitted. FIG. 8 illustrates a screen example of the home screen 8000 in a state where the E code is not displayed. Buttons for starting various applications are displayed in a display area 8001. In this state, each application can be used from the home screen 8000, and printing can also be used.

Display of Service Mode Screen

Next, with reference to FIG. 10, details of display processing of the service mode screen 3000 in S906 will be described. The processing described below is achieved, for example, by the CPU 107 reading the control program stored in the ROM 108 and the HDD 110 into the RAM 109 and executing it.

Figure 3:
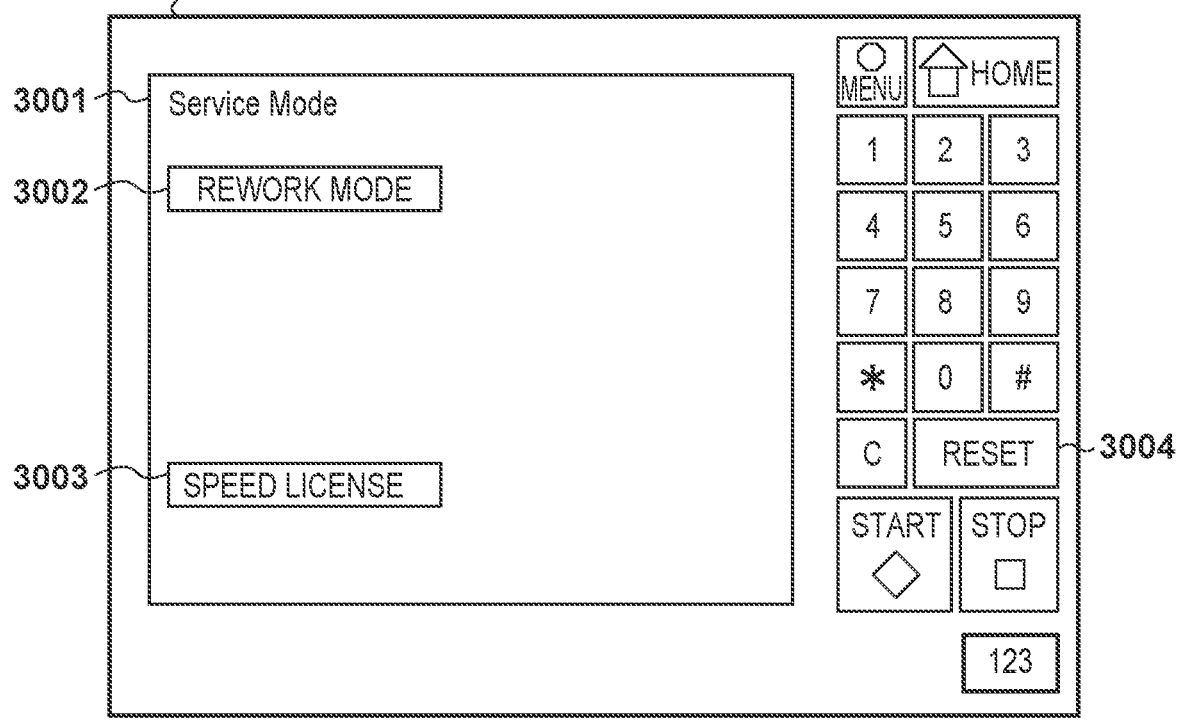
FIG. 3 is a diagram illustrating an example of a service mode screen according to an embodiment.

First, in S1001, the CPU 107 displays the service mode screen 3000 on the display unit 103. FIG. 3 illustrates an example of the service mode screen 3000. A display area 3001 displays a rework mode button 3002 and a speed license button 3003. Subsequently, in S1002, the CPU 107 determines whether the speed license button 3003 has been pressed via the operation unit 104. When the pressing of the speed license button 3003 is detected, the processing proceeds to S1005, and the CPU 107 performs speed license registration processing to end the processing of this flowchart. Details of the speed license registration processing will be described later.

On the other hand, when the pressing of the speed license button 3003 is not detected, the processing proceeds to S1003, and the CPU 107 determines whether the pressing of the reset button 3004 is detected. When the button is pressed, the processing proceeds to S1006, and the CPU 107 displays the home screen 2000 on the display unit 103 to end the processing of this flowchart.

In S1003, when it is determined that the reset button 3004 is not pressed, the processing proceeds to S1004, and the CPU 107 determines whether the pressing of the rework mode button 3002 via the operation unit 104 is detected. When the pressing of the rework mode button 3002 is detected, the processing proceeds to S1007, and otherwise the processing is returned to S1001. In S1007, the CPU 107 performs rework mode setting processing to end the processing of this flowchart.

Here, the rework mode is a predetermined mode different from a normal operation mode in which the image forming apparatus 101 provides a service, and is a mode in which some predetermined functions can be used even if the speed license is unregistered. The predetermined functions include, for example, automatic tone correction, such as image adjustment, density correction, and zoom fine adjustment, and also include functions involving test printing. Note that it is not intended to limit the present invention and other functions using image formation to perform image adjustment may be included. On the other hand, in the rework mode, the function of copy, network connection, PDL, Send, or FAX is not usable.

Speed License Registration Processing

Next, the speed license registration processing in S1005 of FIG. 11 will be described. The processing described below is achieved, for example, by the CPU 107 reading the control program stored in the ROM 108 and the HDD 110 into the RAM 109 and executing it.

Figure 7:
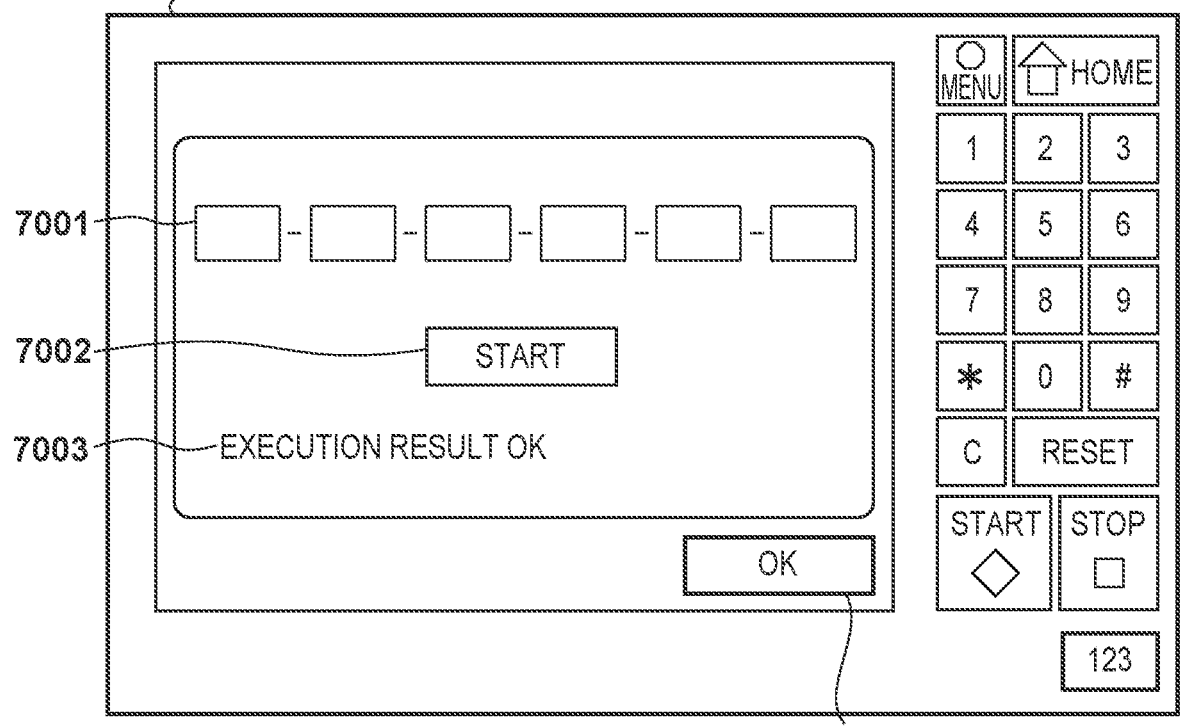
FIG. 7 is a diagram illustrating an example of a speed license input screen according to an embodiment.

In S1101, the CPU 107 functions as a display control unit and displays a speed license registration screen 7000 on the display unit 103. FIG. 7 illustrates a screen example of the speed license registration screen. The speed license registration screen 7000 includes a license input unit 7001, a start button 7002, an execution result display 7003, and an OK button 7004. The OK button 7004 is pressed to close the speed license registration screen 7000. In S1102, the CPU 107 determines whether the OK button 7004 has been pressed via the operation unit 104. When the OK button 7004 is pressed, the processing proceeds to S1109, and the CPU 107 proceeds to home screen display processing to end the processing of this flowchart. In the home screen display processing in S1109, the home screen 2000 or the home screen 8000 is displayed depending on whether the speed license is registered, that is, depending on whether the print speed is set.

On the other hand, when the OK button 7004 is not pressed, the processing proceeds to S1103, and the CPU 107 determines whether the start button 7002 is pressed via the operation unit 104. When the start button 7002 is not pressed, the CPU 107 returns the processing to S1102. When the start button 7002 is pressed, the processing proceeds to S1104, and the CPU 107 acquires a license key input to the license input unit 7001 and analyzes the license key.

Subsequently, in S1105, the CPU 107 determines whether the license key is valid, for example, whether a serial number included in the license key matches a serial number held in the EEPROM 111 as a result of the analysis in S1104. In a case where the license key is invalid, the processing proceeds to S1008, the CPU 107 displays "Failed" on the execution result display 7003 in S1108, and the processing is returned to S1102.

On the other hand, in a case where the license key is valid, the processing proceeds to S1104, the CPU 107 acquires the print speed instructed by the license key from the analysis result, and rewrites the print speed held in the EEPROM 111 by the instructed print speed in S1106. The written print speed is notified to the printer unit 105 on start-up, and thus the actual print speed is determined. After the writing of print speed is completed, in S1007, the CPU 107 displays "OK" in the execution result display 7003, and then advances the processing to the home screen display processing in S1109 to end the processing of this flowchart. The entire speed license registration processing has been described above.

Flow Using Rework Mode

Next, with reference to FIGS. 10 and 12, a description will be given of a processing flow using the rework mode in which printing is exceptionally permitted even if the speed license is unregistered according to the present embodiment. The rework mode is a mode in which, for example, only printing of a test chart for image adjustment can be performed in a limited manner. Here, a switching (transition) method from the normal mode to the rework mode will be described. The processing described below is achieved, for example, by the CPU 107 reading the control program stored in the ROM 108 and the HDD 110 into the RAM 109 and executing it.

Figure 4:
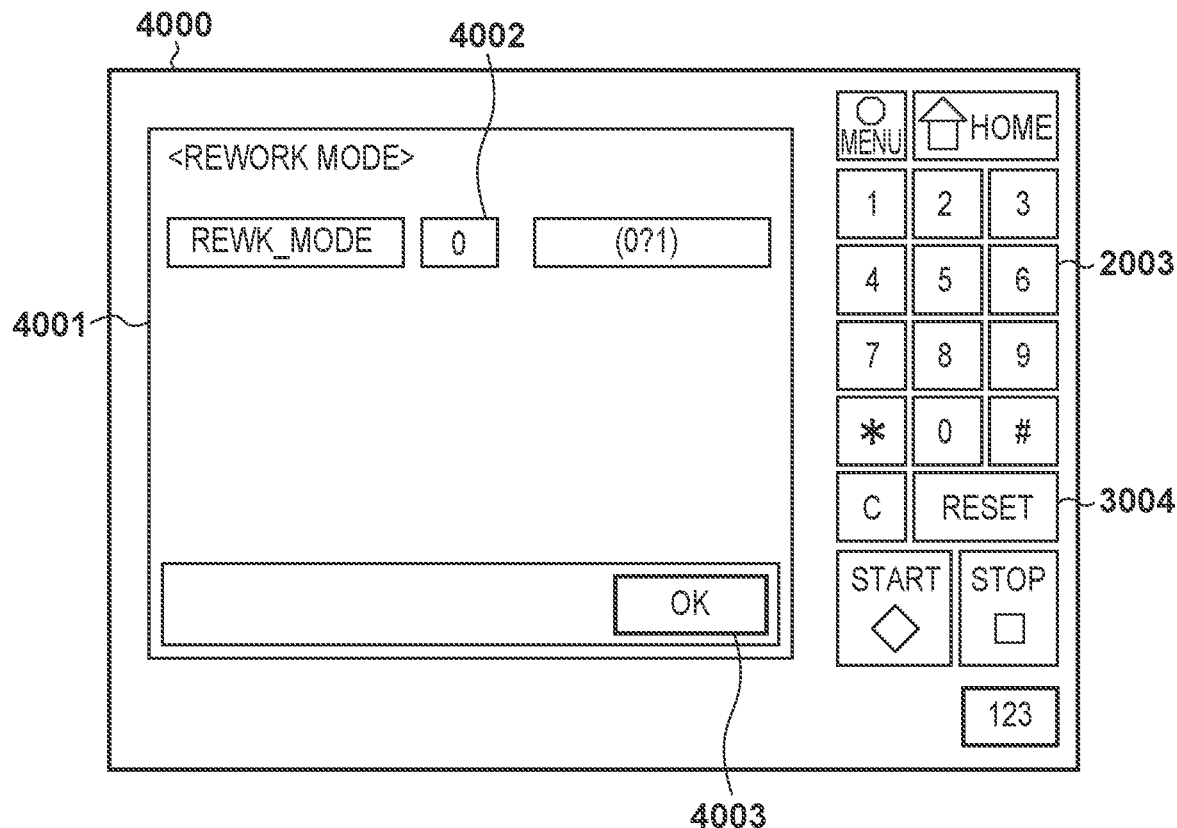
FIG. 4 is a diagram illustrating an example of a rework mode setting screen according to an embodiment.
Figure 12:
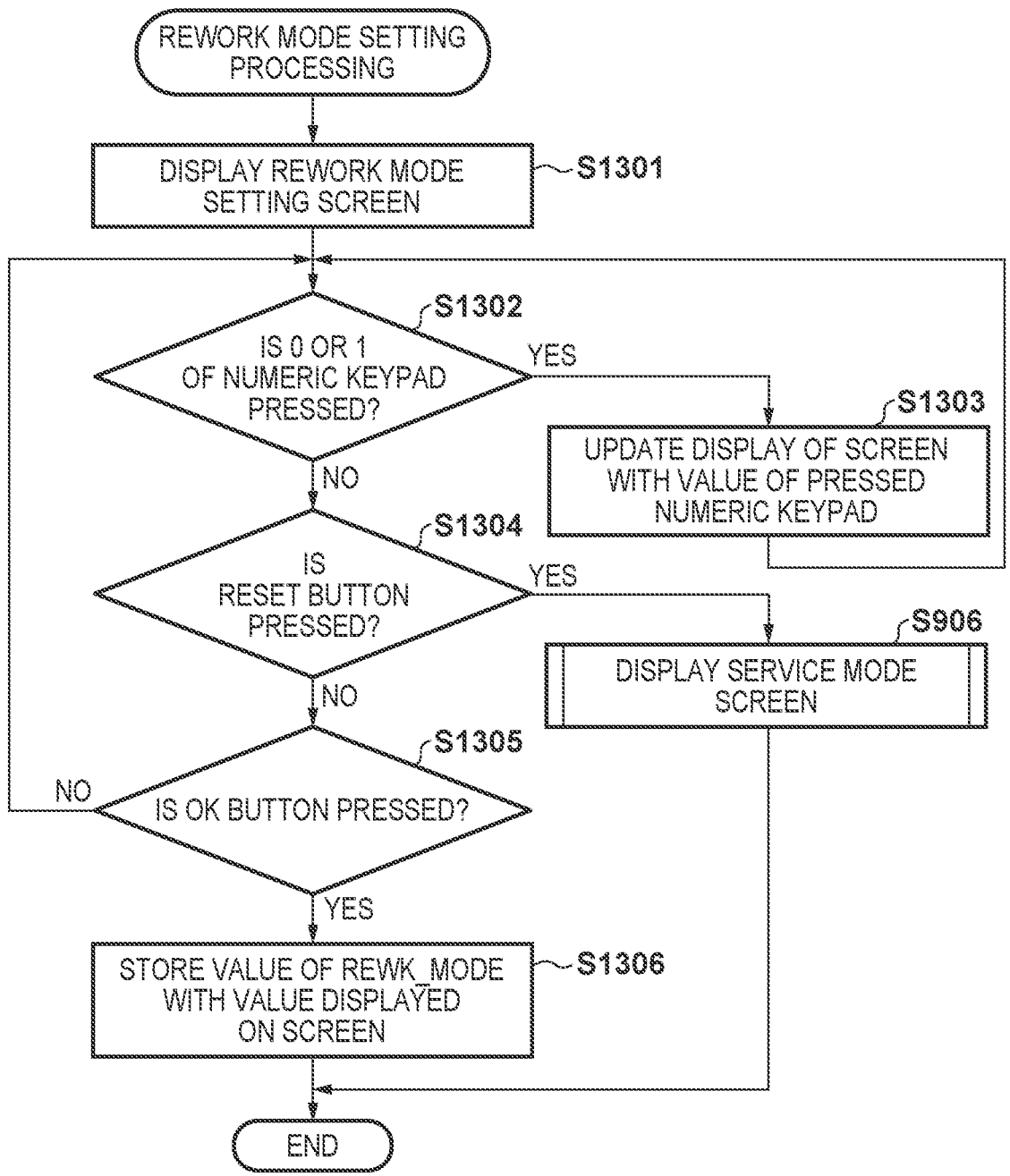
FIG. 12 is a flowchart of rework mode setting processing according to an embodiment.

When the pressing of the rework mode button 3002 is detected in S1004 of FIG. 10, the processing proceeds to S1007, and the rework mode setting processing of FIG. 12 is performed. First, in S1301, the CPU 107 displays a rework mode screen 4000 on the display unit 103. FIG. 4 illustrates an example of the rework mode screen (setting screen) 4000. A display area 4001 displays an input area 4002 for the value of the rework mode and an OK button 4003. When the rework mode screen 4000 is displayed, in S1302, the CPU 107 determines whether the pressing of "0" or "1" in the numeric keypad 2003 via the operation unit 104 is detected. "0" indicates that the rework mode is set to be disabled and "1" indicates that the rework mode is set to be enabled. In a case where the pressing of "0" or "1" is detected, the processing proceeds to S1303, and otherwise the processing proceeds to S1304. In S1303, the CPU 107 updates the display of the input area 4002 of the rework mode with the value of the pressed numeric key, and returns the processing to S1302.

On the other hand, in S1304, the CPU 107 determines whether the pressing of the reset button 3004 via the operation unit 104 is detected. When the pressing of the reset button 3004 is detected, the processing proceeds to S906, and otherwise the processing proceeds to S1305. In S906, the CPU 107 performs service mode screen display processing to end the processing of this flowchart. Further, after the processing proceeds to the service mode screen display processing (S906), when the CPU 107 detects that the reset button 3004 is pressed in S1003, the processing proceeds to the home screen display in S1006, thus ensuring returning to the home screen.

On the other hand, in S1305, the CPU 107 determines whether the pressing of the OK button 4003 via the operation unit 104 is detected. When the pressing of the OK button is detected, the processing proceeds to S1306, and otherwise the processing is returned to S1302. In S1306, the CPU 107 stores the value displayed in the input area 4002 of the rework mode in the RAM 109 to end the processing of this flowchart.

Print Permission Procedure

Figure 13A:
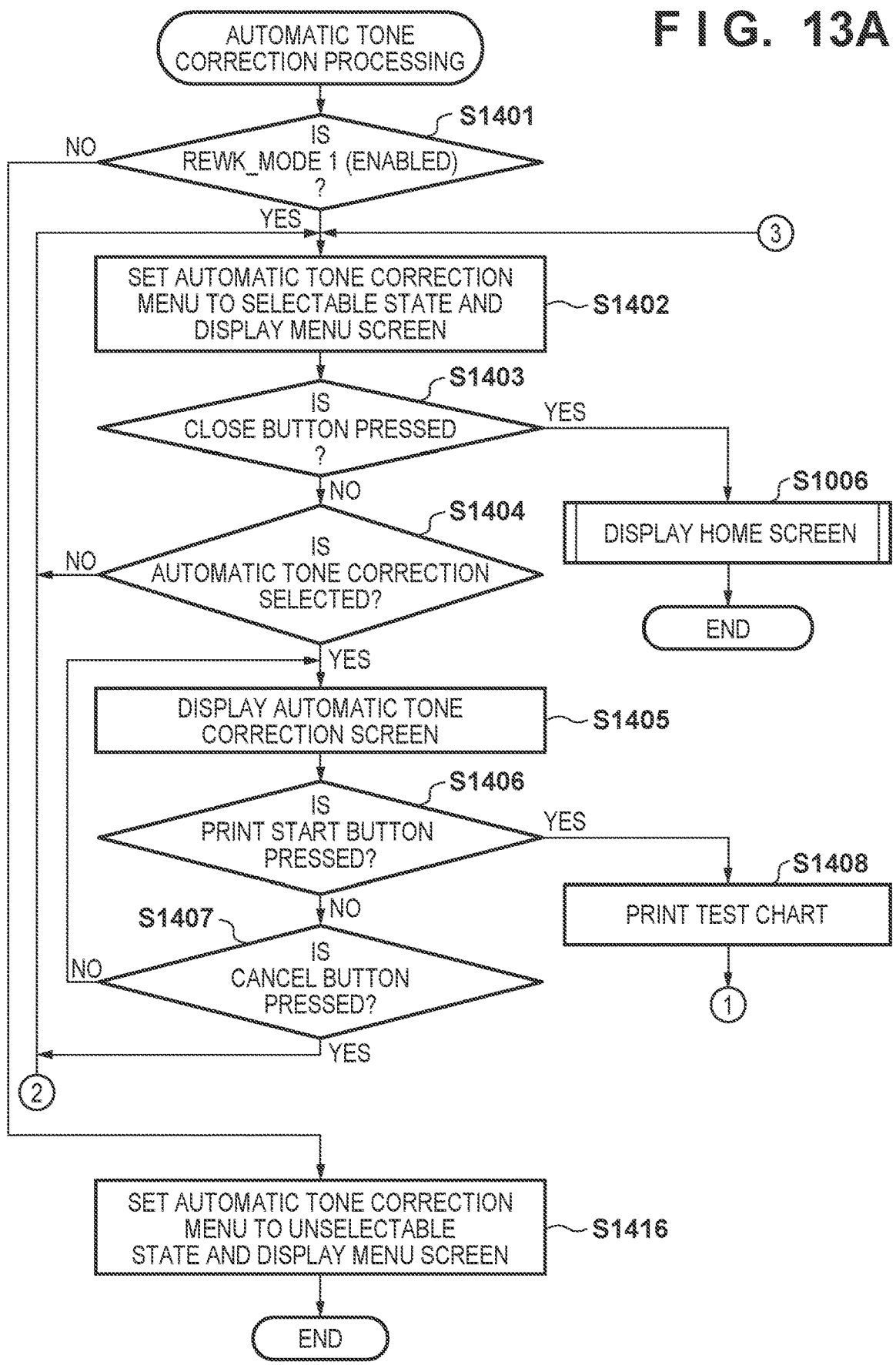
FIGS. 13A-13B are a flowchart of automatic tone correction processing according to an embodiment.
Figure 13B:
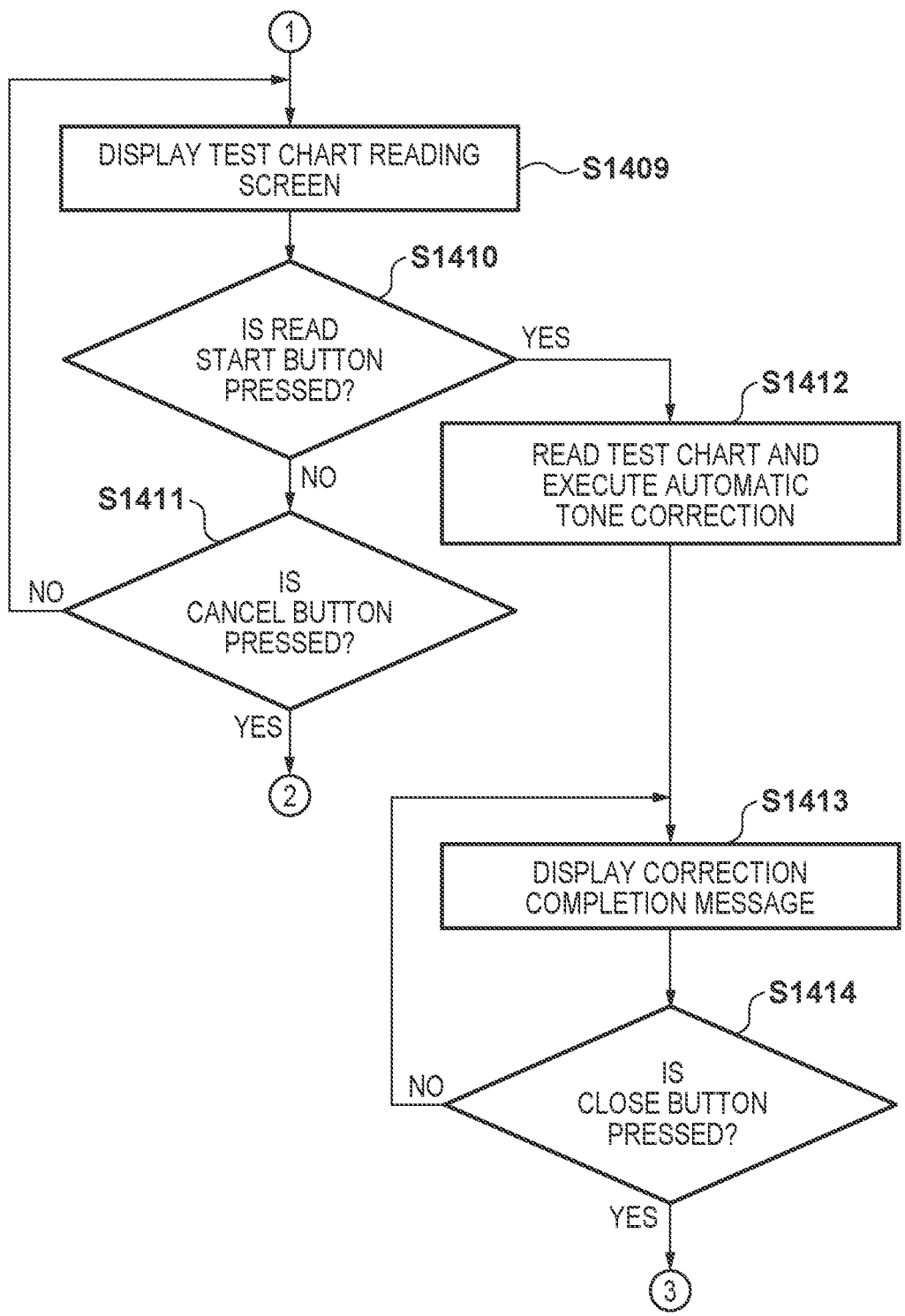

Next, with reference to FIGS. 9 and 13, control for permitting printing for image adjustment in accordance with the value of the rework mode will be described. Here, automatic tone correction will be described as an example. Automatic tone correction processing reads a printed matter of test chart by a scanner and performs correction such that the tone of density becomes correct. Therefore, to complete the automatic tone correction, printing the test chart is necessary. The processing described below is achieved, for example, by the CPU 107 reading the control program stored in the ROM 108 and the HDD 110 into the RAM 109 and executing it.

When the CPU 107 detects that the menu key 2002 is pressed via the operation unit 104 in S905 in FIG. 9, the processing proceeds to menu screen display processing in S907. Details of S907 will be described with reference to FIGS. 13A-13B. First, in S1401, the CPU 107 reads the setting value of the rework mode stored in the RAM 109 in S1306 and determines whether the value is "1 (enabled)." In a case where it is determined that the read value is "1", the processing proceeds to S1402, and otherwise (the value is "0 (disabled)"), the processing proceeds to S1416. In S1416, the CPU 107 sets an automatic tone correction menu 5001 in an unselectable state, and displays the menu screen 5000 on the display unit 103 to end the processing of this flowchart.

Figure 5:
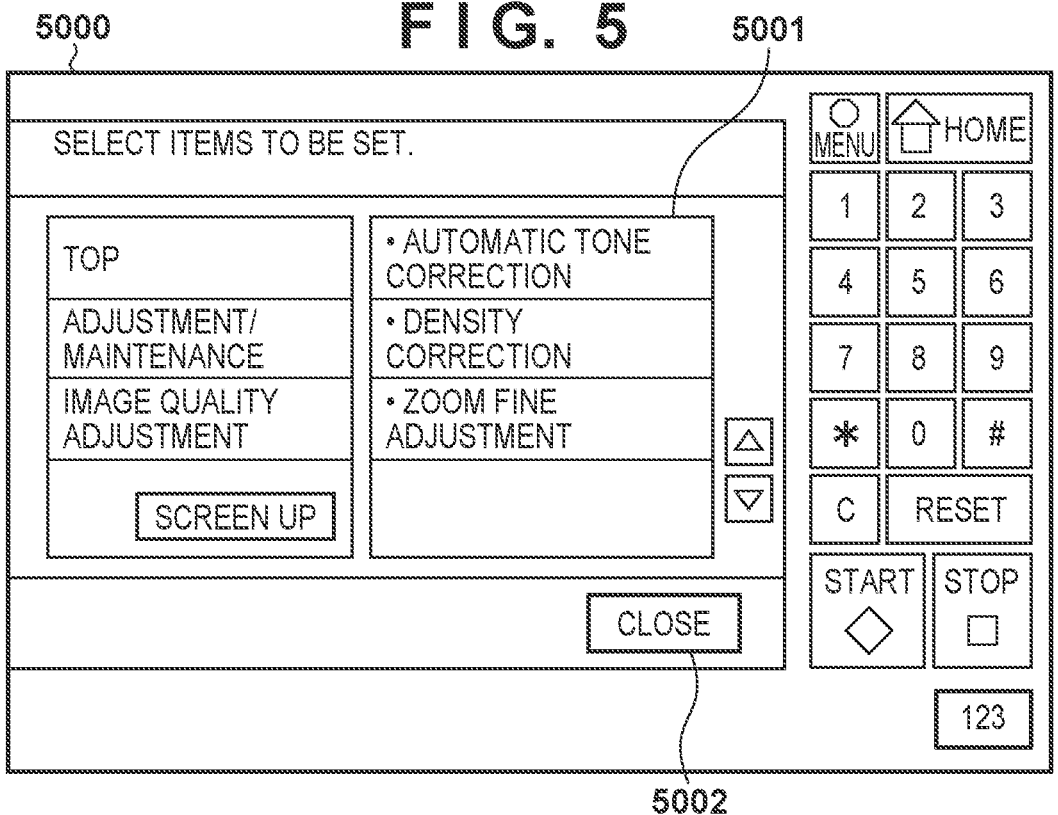
FIG. 5 is a diagram illustrating an example of a menu screen according to an embodiment.

In a case where the read value is "1", in S1402, the CPU 107 sets the automatic tone correction menu 5001 to a selectable state and displays the menu screen 5000 on the display unit 103. FIG. 5 illustrates an example of the menu screen 5000. The menu screen 5000 selectably displays the automatic tone correction menu 5001 and selectably displays a close button 5002. Subsequently, in S1403, the CPU 107 determines whether the pressing of the close button 5002 via the operation unit 104 is detected. When the pressing of the close button 5002 is detected, the processing proceeds to the home screen display processing in S1006 to end the processing of this flowchart. Otherwise, the processing proceeds to S1404.

Figure 6A:
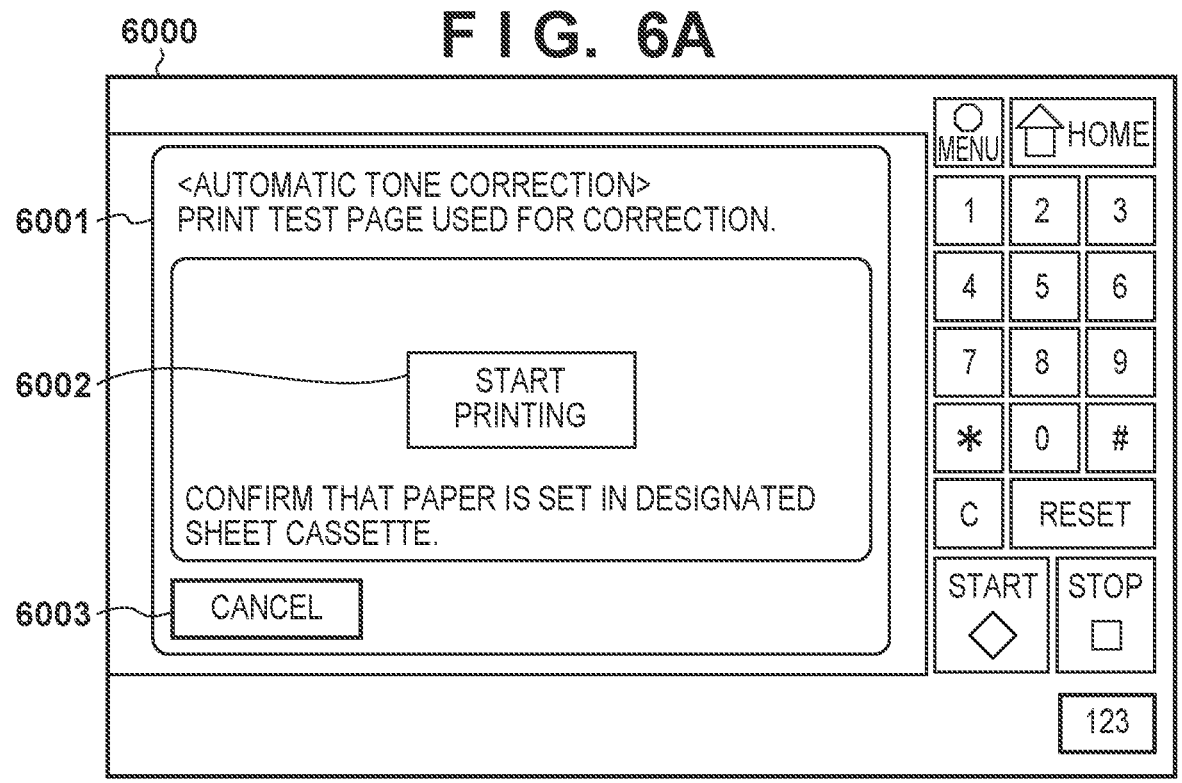
FIG. 6A is a diagram illustrating an example of a print screen for automatic tone correction according to an embodiment.
Figure 6B:
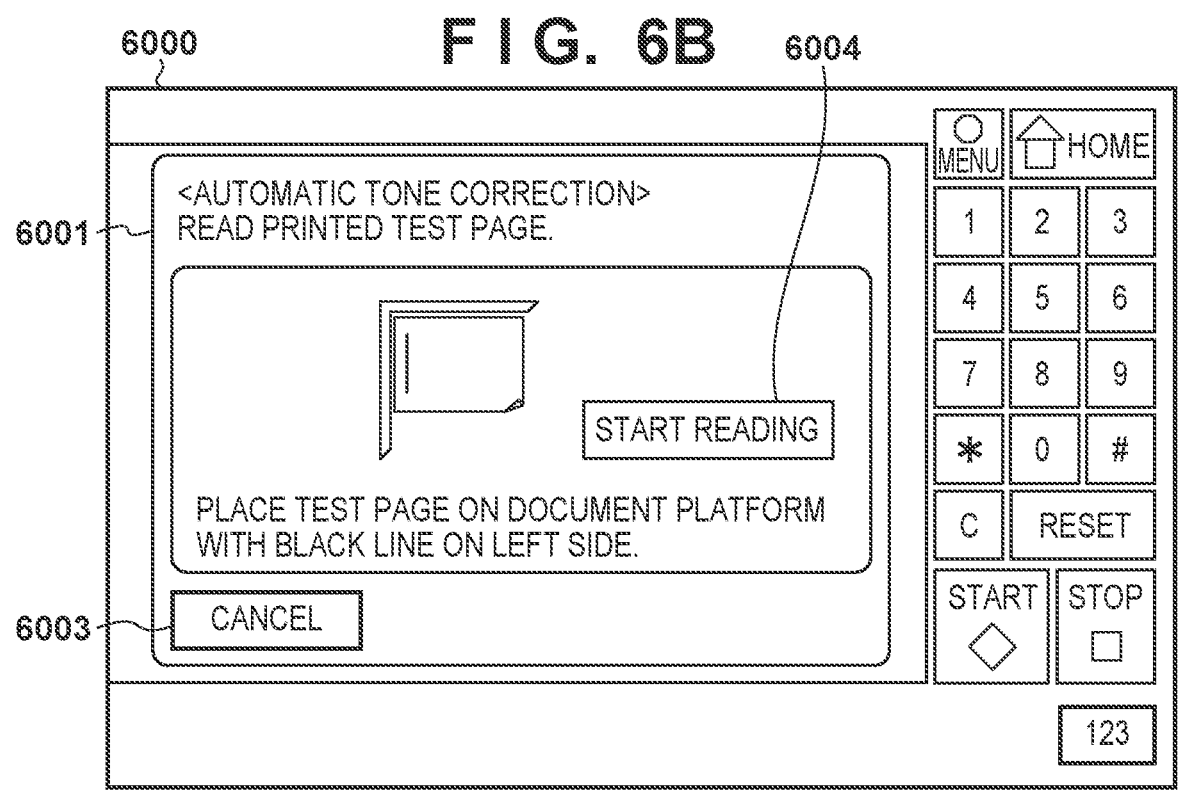
FIG. 6B is a diagram illustrating an example of a scan screen for automatic tone correction according to an embodiment.
Figure 6C:
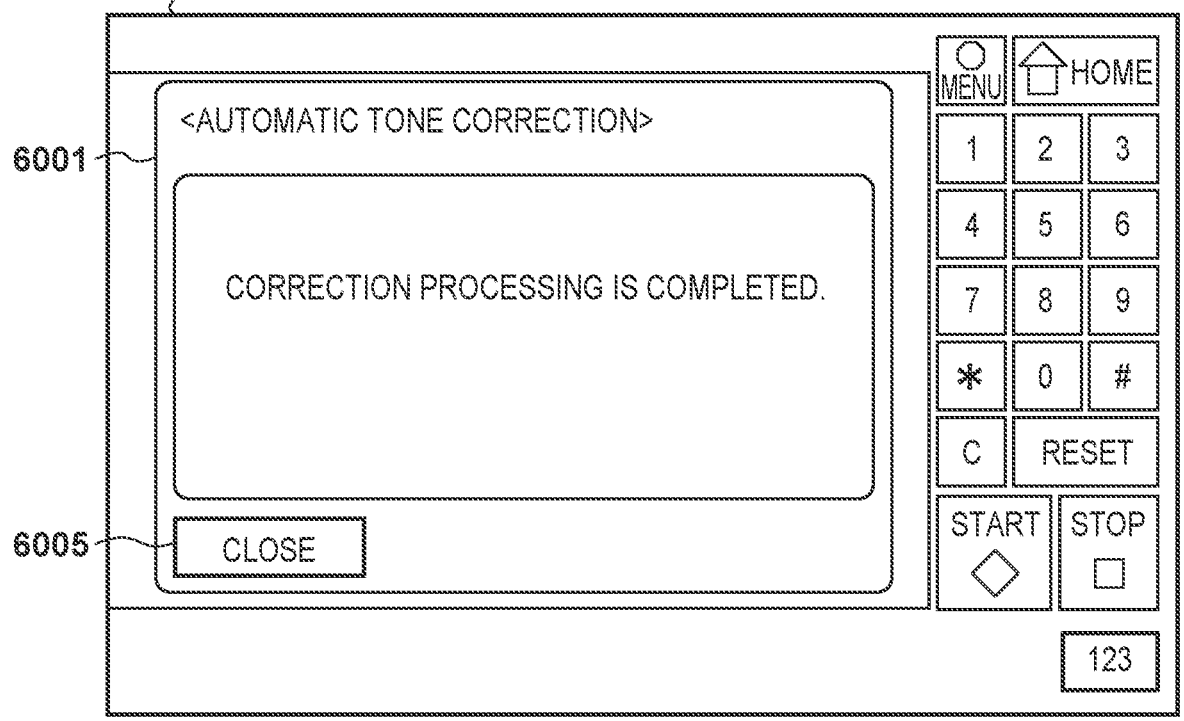
FIG. 6C is a diagram illustrating an example of a correction completion screen for automatic tone correction according to an embodiment.

In S1404, the CPU 107 determines whether the pressing of the automatic tone correction menu 5001 via the operation unit 104 is detected. When it is not detected, the processing is returned to S1402, and when it is detected, the processing proceeds to S1405. In S1405, the CPU 107 displays an automatic tone correction execution screen 6000 on the display unit 103. FIGS. 6A to 6C illustrate an example of an automatic tone correction execution screen. An automatic tone correction execution screen 6000 illustrated in FIG. 6A selectably displays a print start button 6002 and a cancel button 6003 in a display area 6001.

In S1406, the CPU 107 determines whether the pressing of the print start button 6002 is detected. When the pressing is detected, the processing proceeds to S1408, and otherwise the processing proceeds to S1407. In S1407, the CPU 107 determines whether the pressing of the cancel button 6003 is detected. When the pressing of the cancel button 6003 is detected, the processing is returned to S1402, and otherwise the processing is returned to S1405.

On the other hand, when the print start button 6002 is pressed, in S1408, the CPU 107 reads out the test chart stored in the HDD 110, and performs printing via the printer unit 105. As illustrated in FIG. 6B, when the printing is completed, in S1409, the CPU 107 updates the screen display to a screen display that selectably displays a read start button 6004 of the test chart in the display area 6001. An operator sets the test chart printed in S1408 on the scanner. Thereafter, in S1410, the CPU 107 the determines whether the pressing of the read start button 6004 via the operation unit 104 is detected. When the pressing of the read start button 6004 is detected, the processing proceeds to S1412, and otherwise the processing proceeds to S1411. In S1411, the CPU 107 determines whether the pressing of the cancel button 6003 is detected. When the pressing of the cancel button 6003 is detected, the processing is returned to S1402, and otherwise the processing is returned to S1409.

On the other hand, when the pressing of the read start button 6004 is detected, in S1412, the CPU 107 controls the scanner unit 106, reads the image of the test chart, and performs the automatic tone correction processing. Here, the details of the automatic tone correction processing itself are omitted. When the automatic tone correction processing is completed, as illustrated in FIG. 6C, in S1413, the CPU 107 displays a message indicating the completion of correction and also selectably displays a close button 6005 in the display area 6001. Thereafter, in S1414, the CPU 107 determines whether the pressing of the close button 6005 via the operation unit 104 is detected. When the pressing of the close button 6005 is detected, the processing is returned to S1402, and otherwise the processing is returned to S1413.

By performing the above-described control, even in a state where the speed license is unregistered, the rework mode is enabled by the special operation, and in the enabled state, printing can be permitted only for printing related to image adjustment. Therefore, even in a case where hardware replacement is performed before speed license registration and image adjustment processing needs to be performed, only printing for image adjustment processing can be performed before registration of the speed license. Note that even if the home screen is displayed in a state where the rework mode is enabled, the display of the E code does not disappear, and printing of COPY or PDL remains disabled. Although an example in which the rework mode is enabled only for printing related to image adjustment has been described here as an example, this does not intend to limit the present invention, and the rework mode may also be enabled in other cases in which test printing is required.

As described above, the image forming apparatus according to the present embodiment registers the speed license for setting the image forming speed and performs image formation at the image forming speed corresponding to the registered speed license. The image forming apparatus permits image formation in a case where the speed license is registered, and permits image formation in a case where a predetermined condition is satisfied even if the speed license is unregistered. Thus, according to the present invention, printing can be permitted in a case where a certain condition is satisfied even before registration of the license for determining the print speed (image forming speed). For example, even if, for example, hardware replacement is performed and image adjustment processing is required before the license for determining the print speed is registered, only printing for the image adjustment system can be permitted without registering the license. Therefore, issuing a license only for performing image adjustment is unnecessary. In addition, in a case where the subsequent speed change cannot be performed after the license is registered once, this eliminates a need for registering the license for image adjustment, and thus it is possible to register the speed license desired by the user after the image adjustment.

Second Embodiment

Figure 14A:
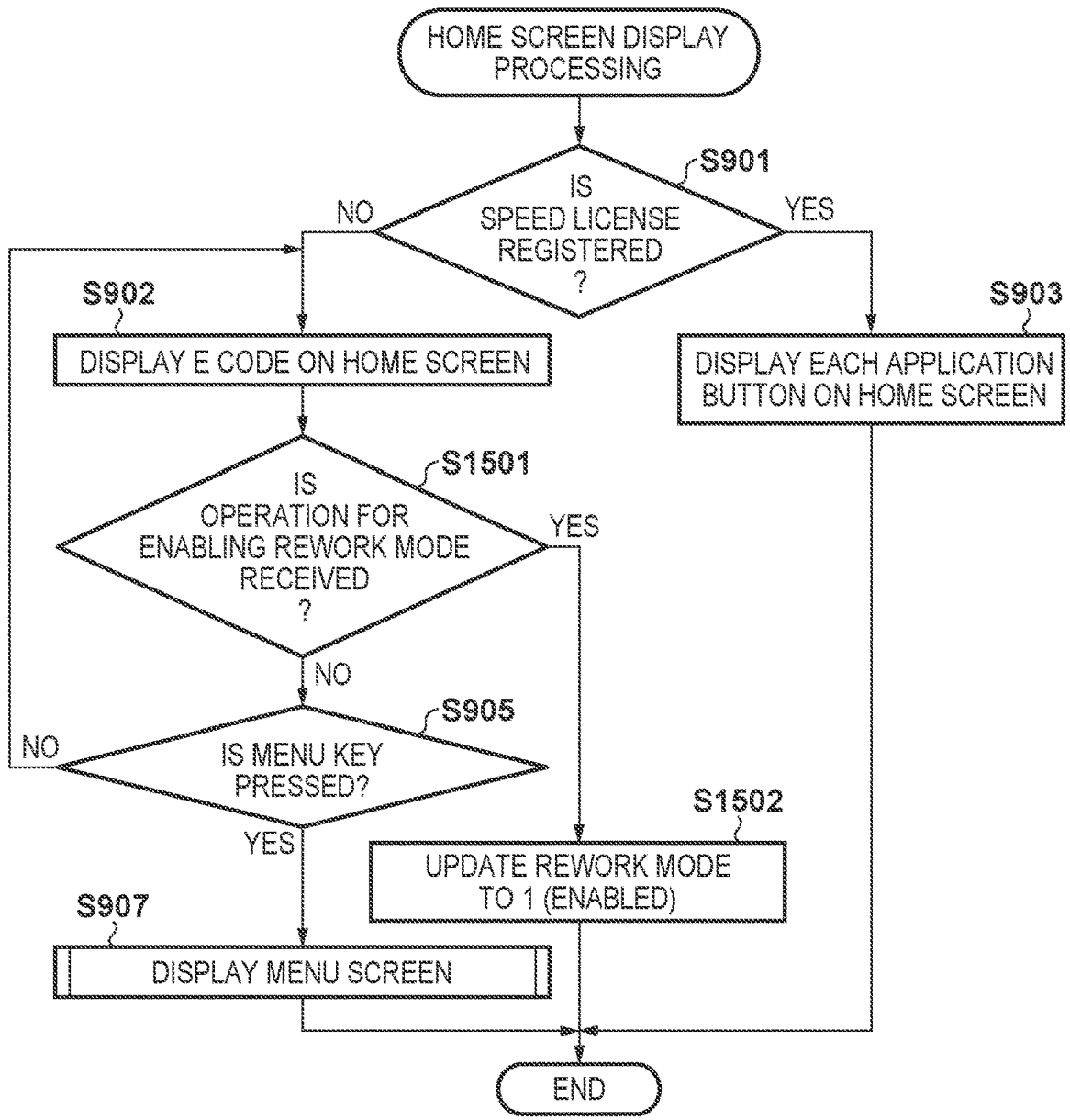
FIG. 14A is a flowchart regarding the rework mode setting processing according to an embodiment.
Figure 14B:
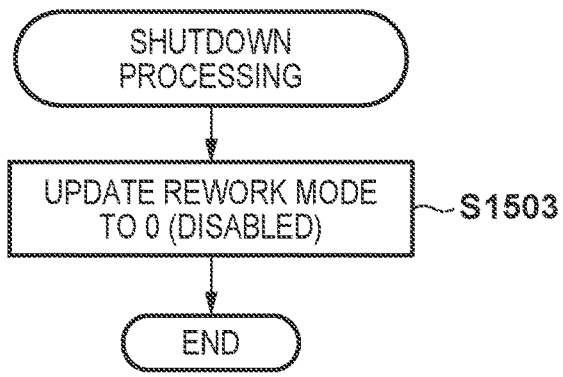
FIG. 14B is a flowchart regarding a method for initializing a rework mode setting according to one embodiment.

The second embodiment of the present invention will be explained below. With reference to FIGS. 14A and 14B, a processing procedure according to the present disclosure will be described. In the present embodiment, a method different from that of the first embodiment will be described as a method for switching a mode in which only printing of the test chart for image adjustment can be limitedly performed even in a state where the speed license is unregistered.

First, FIG. 14A, which is a flowchart depicting the processing procedure for displaying the home screen according to the present embodiment, is referred to. The processing described below is achieved, for example, by the CPU 107 reading the control program stored in the ROM 108 and the HDD 110 into the RAM 109 and executing it. Note that the processing same as the processing content in FIG. 9 is denoted by the same reference numerals and the description thereof is omitted.

After displaying the E code on the home screen in S902, in S1501, the CPU 107 determines whether a special key operation for enabling the rework mode is performed via the operation unit 104. When it is detected that the special key operation has been performed, the processing proceeds to S1502, and otherwise the processing proceeds to S905. In S1502, the CPU 107 changes the value of the rework mode stored in the RAM 109 to 1 (enabled) and stores it. Here, the special key operation for enabling the rework mode is, for example, pressing the counter key 2004, sequentially pressing "7", "8", "9", and "0" in the numeric keypad 2003, and pressing the counter key 2004 again. Thus, when the rework mode is enabled, only the printing for the image adjustment system can be performed by the same method as in the flowchart of FIGS. 13A-13B described in the first embodiment.

On the other hand, as a method of returning the rework mode to 0 (disabled), a method as illustrated in FIG. 14B is conceivable. FIG. 14B illustrates a processing procedure for shutdown processing according to the present embodiment. The processing described below is achieved, for example, by the CPU 107 reading the control program stored in the ROM 108 and the HDD 110 into the RAM 109 and executing it. Note that the same processing as the processing content in FIG. 9 is denoted by the same reference numerals and the description thereof is omitted.

In S1503, when receiving a shutdown request of the image forming apparatus 101, the CPU 107 updates the value of the rework mode stored in the RAM 109 to 0 (disabled) and stores the value to end the processing of this flowchart. As a method other than updating at the time of shutdown, a method of updating to 0 (disabled) by performing the special key operation described in S1501 again may be applied.

As described above, the image forming apparatus according to the present embodiment enables the predetermined mode (rework mode) when the predetermined key operation is received in the screen on which the error code is displayed. Turning off the power of the image forming apparatus disables the enabled predetermined mode. This allows direct transition to the rework mode without via the service mode screen, and also obtains the same effect as that of the first embodiment. That is, the rework mode can be enabled more efficiently.

According to the present invention, even before registration of the license to determine the print speed, in a case where certain conditions are satisfied, printing can be permitted.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-022953, filed Feb. 17, 2022, which is hereby incorporated by reference herein in its entirety.

What is claimed is:

1. An image forming apparatus, comprising:
   a registration unit that registers a speed license for setting an image forming speed;
   an image forming unit that performs image formation at an image forming speed corresponding to the speed license registered by the registration unit; and
   a control unit that permits the image formation by the image forming unit in a case where the speed license is registered by the registration unit, and permits the image formation by the image forming unit in a case where an operation mode of the image forming apparatus is a predetermined mode different from a normal operation mode if the speed license is unregistered by the registration unit.

2. The image forming apparatus according to claim 1, wherein
   a predetermined function including the image formation by the image forming unit is usable in the predetermined mode.

3. The image forming apparatus according to claim 2, wherein the predetermined function includes at least functions of automatic tone correction, density correction, and zoom fine adjustment.

4. The image forming apparatus according to claim 2, wherein at least functions of copy, network connection, PDL, Send, and FAX are unusable in the predetermined mode.

5. The image forming apparatus according to claim 1, wherein the predetermined mode is enabled in a case where a predetermined key operation is received.

6. The image forming apparatus according to claim 5, further comprising a display control unit that displays an error code on a display unit in a case where the image forming apparatus is started before the speed license is registered by the registration unit, wherein in a case where the predetermined key operation is received in a screen on which the error code is displayed, the display control unit displays a setting screen for enabling or disabling the predetermined mode on the display unit, and the predetermined mode is enabled or disabled in accordance with a setting via the setting screen.

7. The image forming apparatus according to claim 6, wherein the speed license is further allowed to be input in the setting screen.

8. The image forming apparatus according to claim 5, further comprising a display control unit that displays an error code on a display unit in a case where the image forming apparatus is started before the speed license is registered by the registration unit, wherein in a case where the predetermined key operation is received in a screen on which the error code is displayed, the predetermined mode is enabled.

9. The image forming apparatus according to claim 8, wherein the enabled predetermined mode is disabled by turning off a power of the image forming apparatus.

10. A control method for an image forming apparatus including an image forming unit, comprising:

registering a speed license for setting an image forming speed;

controlling permitting image formation by the image forming unit in a case where the speed license is registered in the registering; and controlling permitting the image formation by the image forming unit in a case where an operation mode of the image forming apparatus is a predetermined mode different from a normal operation mode even if the speed license is unregistered in the registering.

11. A non-transitory computer-readable storage medium storing a program for causing a computer to execute each step in a control method for an image forming apparatus including an image forming unit, the control method comprising:

registering a speed license for setting an image forming speed;

controlling permitting image formation by the image forming unit in a case where the speed license is registered in the registering; and controlling permitting the image formation by the image forming unit in a case where an operation mode of the image forming apparatus is a predetermined mode different from a normal operation mode even if the speed license is unregistered in the registering.

* * * * *